United States Patent
Maatta et al.

(10) Patent No.: US 7,627,337 B2
(45) Date of Patent: Dec. 1, 2009

(54) DUAL LEVER SLIDE MECHANISM FOR EXTENDIBLE DEVICE HOUSINGS

(75) Inventors: Esa-Sakari Maatta, Viiala (FI); Tomas Ivaskevicius, Helsinki (FI); Mikko Ukonaho, Nokia (FI); Anssi Vanska, Helsinki (FI)

(73) Assignee: Nokia Corporation, Espoo (FI)

( * ) Notice: Subject to any disclaimer, the term of this patent is extended or adjusted under 35 U.S.C. 154(b) by 428 days.

(21) Appl. No.: 11/405,651

(22) Filed: Apr. 17, 2006

(65) Prior Publication Data
US 2007/0243896 A1 Oct. 18, 2007

(51) Int. Cl.
*H04M 1/00* (2006.01)
(52) U.S. Cl. .................. 455/550.1; 455/90.3; 455/566; 455/575.1; 455/575.4
(58) Field of Classification Search .............. 455/550.1, 455/90.3, 566, 575.1, 575.4, 557
See application file for complete search history.

(56) References Cited

U.S. PATENT DOCUMENTS

| | | | |
|---|---|---|---|
| 7,069,056 B2 * | 6/2006 | Iwata et al. | 455/566 |
| 7,231,039 B2 * | 6/2007 | Gronroos et al. | 379/428.02 |
| 2002/0032041 A1 * | 3/2002 | Hirai et al. | 455/557 |
| 2003/0008538 A1 * | 1/2003 | Murnaghan et al. | 439/159 |
| 2004/0229664 A1 * | 11/2004 | Chadha | 455/575.1 |
| 2005/0003871 A1 * | 1/2005 | Shiue et al. | 455/575.3 |
| 2005/0044665 A1 | 3/2005 | Kuramochi | |
| 2005/0288077 A1 * | 12/2005 | Wu | 455/575.4 |
| 2006/0128449 A1 | 6/2006 | Park | |
| 2006/0197863 A1 * | 9/2006 | Kim | 348/335 |

FOREIGN PATENT DOCUMENTS

| | | |
|---|---|---|
| EP | 1796351 | 6/2007 |
| KR | 100662442 | 12/2006 |
| WO | WO 2004038941 | 5/2004 |

\* cited by examiner

*Primary Examiner*—Joseph H Feild
*Assistant Examiner*—Huy D Nguyen
(74) *Attorney, Agent, or Firm*—Hollingsworth & Funk, LLC

(57) ABSTRACT

The present invention provides an extendible mobile electronic device with a housing having a first housing element comprising a first front surface and a first rear surface and a second housing element, comprising a second front surface and a second rear surface. Said first housing element, and said second housing element are extensibly supported to each other, such that said first and second housing elements can adopt a retracted position and an extended position with respect to each other. In said retracted position said first housing element and said second housing element are located substantially on top of each other, said first rear surface conformingly adjoining said second front surface. In said extended position said first housing element is displaced with respect to said second housing element and at least a section of said second front surface is adjoining said and flushing with said first front surface.

31 Claims, 7 Drawing Sheets

Fig. 4a                    Fig. 4b

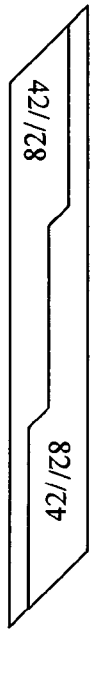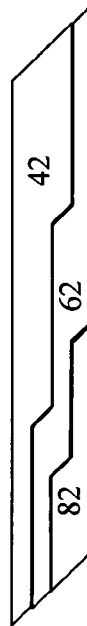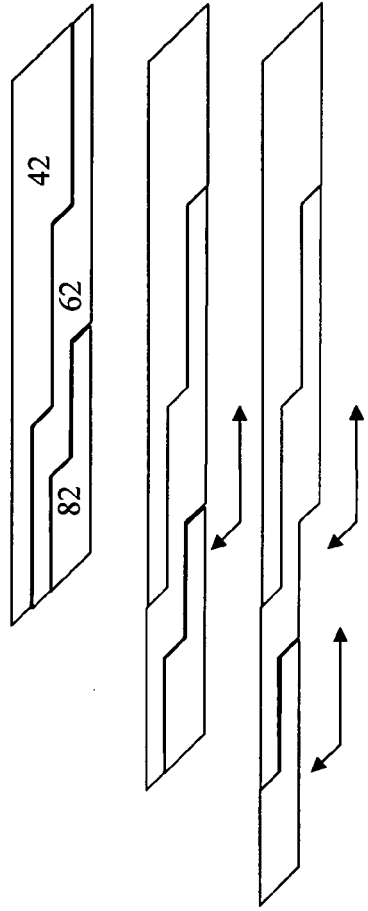
Fig. 5a  Fig. 5b  Fig. 5c

DUAL LEVER SLIDE MECHANISM FOR EXTENDIBLE DEVICE HOUSINGS

FIELD OF THE INVENTION

The present invention relates to the field of mobile devices. In particularly, the present invention relates to the field of in general extendible devices, especially applicable to slidable devices and/or and mobile/portable (electronic) devices.

BACKGROUND

Slidable mobile or portable electronic devices such as consumer electronic (CE) devices, mobile telephones, palmtops, and communicators are well known in the art and are available from a huge number of different manufacturers.

Especially, in the technical field of cellular telephones two main types of extendible devices are available, the flip cellular telephones, clamshell cellular telephones, or slidable cellular telephones such as the Nokia's Models N71 and N80. Sliding phones like the Nokia's Model N80 have typically a large display and an ITU-T keypad that becomes accessible when the front part of the two-piece housing is displaced upwards (forwards). Further form factors and extension mechanisms are also known in the technical field of cellular telephones. Exemplarily, rotatable/pivotable mechanisms such as implemented with Nokia's Model 7370 and mechanisms combining one or more of the above mentioned mechanisms e.g. Nokia's Model N90 have been developed.

However, the known approaches and designs of slidable mobile devices typically having a two-piece housing suffer from a common disadvantage in view of usability. The keypads and the display are arranged in different and typically substantially parallel planes due to their arrangement with different parts of the two-piece housing. Conventionally, keys destined for navigation through the user interface such as a multi-directional switch or joystick and/or keys for initiating/answering and/or ending a call are arranged with the part of the housing which comprises the display, whereas the more space requiring ITU-T keypad is arranged with the other part of the housing. For instance during inputting a telephone number and initiating the call set-up, a user has to actuate one or more keys of the ITU-T keypad as well as one or more keys arranged at the housing part comprising the display. Due to the thickness of the housing part comprising the display, the user may find the different levels at which the keys are arranged irritating or annoying.

SUMMARY OF THE INVENTION

It is an object of the present invention to improve the operability of slidable mobile devices and to enhance the usability of such slidable mobile devices.

One object of the invention is solved by the features of the accompanying independent claim 1.

According to an aspect of the present invention, an extendible mobile or portable electronic device, in particular a portable consumer electronic (CE) device, is provided, which comprises inter alia a configurable device housing, which has at least a first housing element with a first front surface and a first rear surface, and a second housing element with a second front surface and a second rear surface, and an extension mechanism.

The extension mechanism is adapted to enable the first housing element and the second housing element extensibly supporting each other, such that the first and second housing elements can adopt a retracted configuration and an extended configuration with respect to each other.

The extension mechanism comprises at least one lever and slide mechanism, which comprises inter alia a guideway body element and a lever mechanism, and at least one slidable counterpart element. The lever mechanism is pivotably attached to the guideway body element and the slidable counterpart element is adapted for slidable engagement with the guideway body elements. The lever mechanism is attached to one of the first and second housing elements and the slidable counterpart element is provided for being attached to the other one of the first and second housing elements.

According to an embodiment of the present invention, a conversion of the device housing from the retracted configuration to the extended configuration comprises a first movement of the housing elements substantially parallel to each other and a second shift movement of the housing elements approaching each other. The first and second movements may be substantially consecutive. When converting from retracted to extended configuration, the second should substantially follow the first movement and when converting from extended to retracted configuration, the first should substantially follow the second movement.

According to an embodiment of the present invention, the at least one slidable counterpart element is a slidable frame element having at least one sliding area, which slidably engages with the guideway body element of the at least one lever and slide mechanism.

According to an embodiment of the present invention, the guideway body element has a guideway groove element or a guideway projection element for slidably guidance of the slidable counterpart element.

According to an embodiment of the present invention, the guideway body element is shaped to be at least partly enclosed by the slidable counterpart element. The slidable counterpart element has preferably a correspondingly shaped recess enabling the at least partly enclosure and sliding engagement with the guideway body element.

According to an embodiment of the present invention, the guideway body element slidably engaged with the slidable counterpart element enables for sliding the housing elements in a movement substantially parallel to at least one of the front surfaces of the housing elements.

According to an embodiment of the present invention, the lever mechanism is pivotably attached to one of the first and second housing elements to allow the housing elements to approach each other by a substantially shift movement. In particular, the shift movement is performable by substantially maintaining orientations of the housing elements in relation to each other.

According to an embodiment of the present invention, the lever and slide mechanism further comprises a fixture element, which is adapted to attach the lever mechanism to one of the first and second housing elements.

According to an embodiment of the present invention, the lever mechanism further comprises at least two lever elements. One end of each lever element is pivotably attached to the guideway body element and the other end thereof is pivotable attached to one of the first and second housing elements.

According to an embodiment of the present invention, an orientation of the guideway body element defines a direction of extension of the extendible device housing.

According to an embodiment of the present invention, the extension mechanism comprises two lever and slide mechanisms. One of the lever and slide mechanisms is preferably arranged in relation to one side of the device housing and the other one thereof is arranged in relation to an opposite side of the device housing. The side and opposite side of the device housing are defined in relation to a direction of extension.

According to an embodiment of the present invention, the slidable counterpart element comprises two slidable elements, each of which engages with one guideway body element of the two lever and slide mechanisms.

According to an embodiment of the present invention, the extension mechanism comprises one lever and slide mechanism, which is in particular centrally arranged in relation to device housing and/or for instance centrally in relation to the side faces of the housing elements.

According to an embodiment of the present invention, in the retracted configuration, the first housing element is substantially located on the top of the second housing element, or vice versa. The first rear surface should conformingly adjoin the second front surface. The arrangement of the housing elements may be considered as a substantially stacked arrangement of the elements.

According to an embodiment of the present invention, in the extended configuration, the first housing element is displaced with respect to the second housing element. At least a section of the first rear surface should adjoin at least a section of the second front surface, i.e. the first rear surface should partially adjoin the second front surface. In particular, the first rear surface partially conformingly adjoins the second front surface.

According to an embodiment of the present invention, in the extended configuration, the first front surface flush with the second front face. This means that the exposed front surfaces of the first and second housing elements should be displaced in a common plane in space and the term "exposure" should be understood herein as exposed to the external to exterior of the device. Moreover, the first and second housing elements are arranged at the same level, substantially.

According to an embodiment of the present invention, the first rear and the second front surfaces have a stepped shape in cross-sectional view, i.e. in side view or any cross-sectional views parallel to the side views. The stepped shape may be understood as s substantially stepped outline shape of the housing elements.

According to an embodiment of the present invention, the device further comprises a display, which is in particular arranged on the first front surface, a user input interface element, which is in particular arranged on the section of the second front surface; and processing means such as a processor, micro processor, a controller, a micro controller, and/or any processing means adapted to the constrictions and requirements of mobile devices, which are preferably connected to the display and to user input interface element and operates the device.

According to an embodiment of the present invention, the device further comprises one or more applications operable with said device; and a sensor for detecting said configuration of said device housing. The one or more applications are reactive to a signal supplied by said sensor. The signal is indicative of the housing configuration.

According to an embodiment of the present invention, the device is further provided with a pawl for locking the housing in the retracted and/or in the extended configuration.

According to an embodiment of the present invention, the device further comprises a cellular telephone module, which enables for cellular communications with the device.

BRIEF DESCRIPTION OF THE DRAWINGS

FIGS. 4a to 4c show schematically different views of a device having a landscape form factor according to an embodiment of the present invention, which housing configuration comprises three housing elements, depicted in a retracted, partially (one-sided) extended, and a substantially fully (two-sided) extended configurations; and FIGS. 5a to 5c show schematic side views of three different embodiments of mobile electronic terminal devices in retracted configurations as well as extended configurations.

DETAILED EMBODIMENTS OF THE INVENTION

Figure 1A:
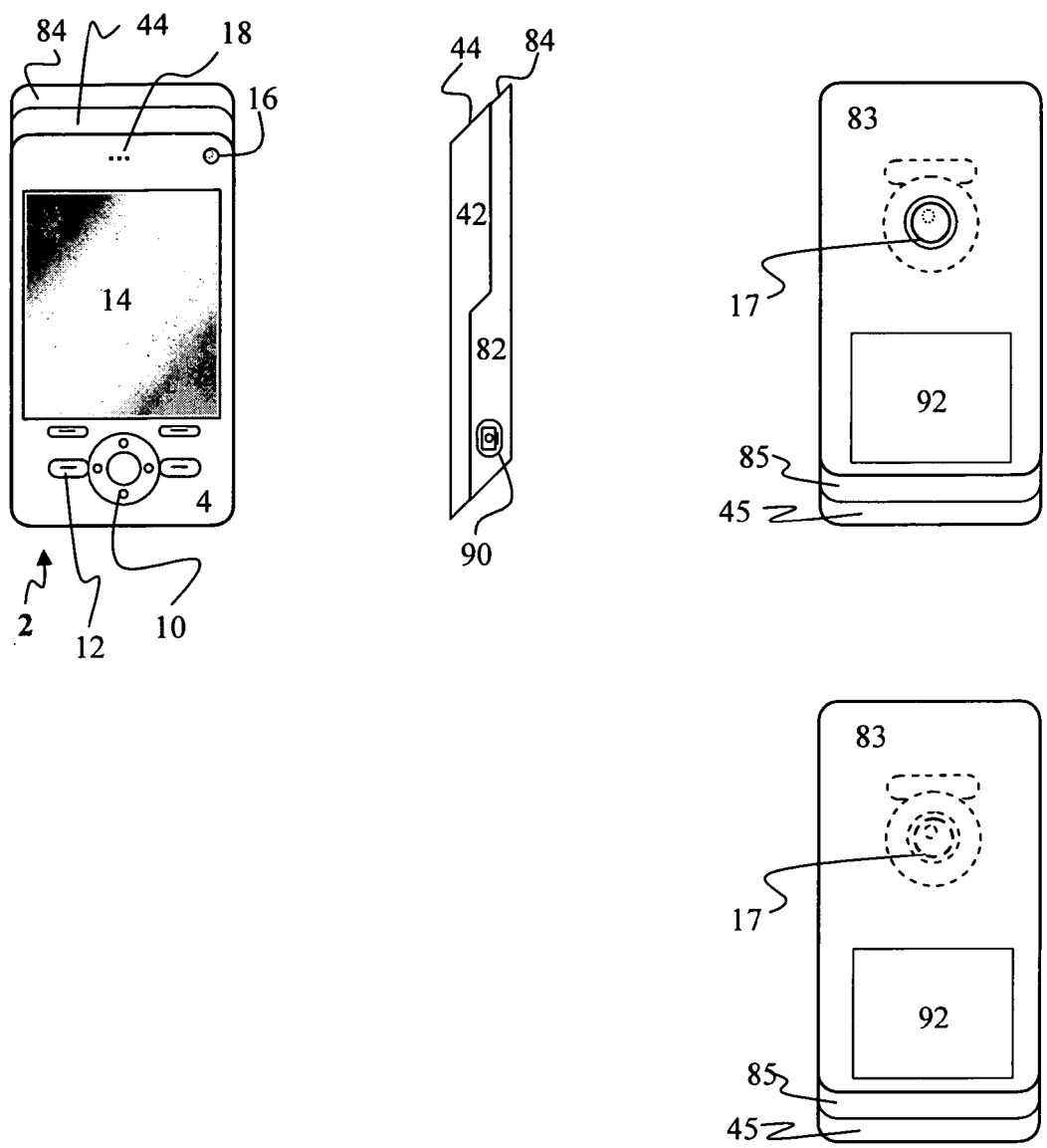
FIG. 1a depicts schematic plan views of a device according to an embodiment of the present invention with two housing elements depicted in a retracted (housing) configuration.

In the detailed description, which follows, same or identical components have been given the same reference numerals, regardless of whether they are shown in different embodiments of the present invention. In order to clearly and concisely illustrate the present invention, the drawings may not necessarily be to scale and certain features may be shown in somewhat schematic form. Especially in embodiments in which both housing elements may be used as first or second housing elements both housing elements are provided with reference signs.

Figure 1B:
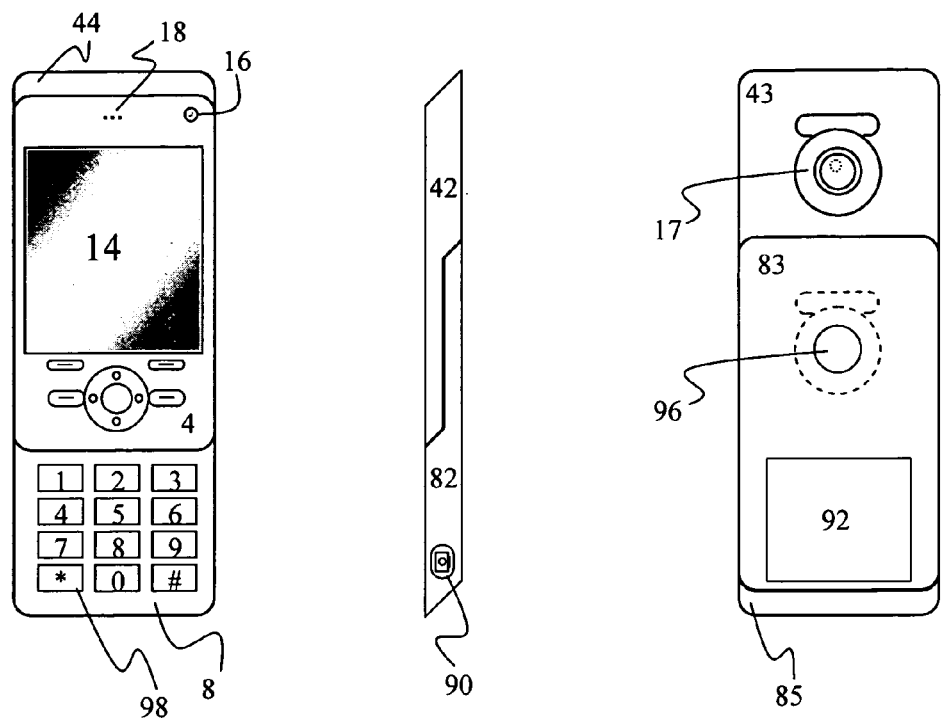
FIG. 1b shows schematic plan views of the embodiment of FIG. 1a depicted in an extended (housing) configuration.

FIGS. 1a and 1b show an embodiment of an extendible mobile electronic device 2 of the present invention in different plan views. The depicted extendible mobile electronic device 2 is embodied as an extendible cellular phone. The invention should be understood as not being limited to mobile electronic device having any specific functionality. Each figure comprises several individual views, which are from left to right in FIG. 1a: front plan view, side plan view, and rear plan view (two embodiments in stacked alignment), wherein each view illustrates the device 2 in a substantially retracted position. The individual views of FIG. 1b are from left to right: front plan view, side plan view, and rear plan view, wherein each individual view illustrates the device 2 in the substantially extended position.

According to the embodiments depicted in FIGS. 1a and 1b, the device 2 has a two-piece housing arrangement, which comprises a first housing element 4 and a second housing element 8. Moreover, the embodiments depicted in FIGS. 1a and 1b illustrate the housing elements 4 and 8 arranged in a retracted position and retracted (housing) configuration, respectively. The retracted (housing) configuration may be distinguished in that the first housing element 4 is located substantially on the top of the second housing element 8.

In FIG. 1a, the device 2 embodied as a cellular telephone comprises a substantially large display 14, a few basic control keys (such as a 4-way-navigation button 10 and menu keys 12), a small video phone camera 16 at top position at the right side, and an earpiece 18 in a centered position arranged over the display 14. In the front view, the first housing element 4 is substantially visible, whereas the second housing element 8 is substantially covered by the first housing element 4 (but not necessarily completely). At the top of the device 2 (in respect to the conventional position of the device 2, in which the device 2 is intended for being handled by a user), inclined top faces 44 and 84 of the device 2 and a parting line between the housing elements 4, 8 may be at least partly visible. The inclined shaped top faces 44 and 84 of the first and second housing elements 4, 8 are illustratively indicated at the top of the front view.

The parallelogram shaped overall structure depicted at a middle position of FIG. 1a illustrates a side view, for instance the right hand side view, of the device 2 provided with an optional housing unlocking button (or a shutter release button) 90. The parting line between a side face 42 of the first housing element 4 and a side face 82 of the second housing element 8 is illustrated and divides this embodiment into substantially similar shaped housing elements. The housing elements 4, 8 are shaped in cross section such to enable a substantially conforming arrangement of the adjoining faces of the housing elements being arranged in retracted housing configuration. The first and the second housing elements 4, 8 substantially overlap each other having the conformingly adjoining arrangement. Is it also envisaged to implement an unlocking key e.g. at the left hand side of the device (not depicted). Additionally, the inclined shaping of the inclined top faces 44 and 84 of the first and second housing elements 4, 8 as well as the inclined bottom faces 45 and 85 of the first and second housing elements 4, 8 are depicted and indicated.

The drawing shown in FIG. 1a at right hand side depicts rear views of two embodiments of the device 2. The rear view of the embodiment of the device 2 depicted at upper position of FIG. 1a shows an aperture 96 for a lens of an optional camera module 17 in the first housing element 4 that can be seen through the aperture 96 in the second housing element 8 in the rear view 83.

The rear view of the embodiment of the device 2 shown at lower position of FIG. 1a depicts no aperture for a lens. The optional camera module 17 in the first housing element 4 is merely indicated by the means of interrupted lines. In the rear views of the embodiments, a cover of a battery compartment 92 (SIM compartment and/or memory card compartment) is additionally indicated by the small rectangle in the lower section of the rear view.

The left-hand side drawing of FIG. 1b shows a front view of the device 2 in a substantially extended position and in a substantially extended (housing) configuration, respectively, wherein at the upper part the inclined top face 84 of the second housing element 8 is not longer visible and at the lower housing section the second housing element 8 comprising an ITU-T keypad 98 is visible. In substantially extended (housing) configuration, the first housing element 4 is displaced with respect to the second housing element 8 and the second housing element 8 is partly uncovered from the first housing element 4.

The drawing positioned at the center of FIG. 1b shows a parallelogram shaped overall structure of the device 2 in side view, wherein the housing elements 4, 8 are in substantially extended position and are arranged in substantially extended housing configuration, respectively. The optional unlocking button 90 is arranged at the side face 82 of the second housing element 8. The first housing element 4 and the second housing element 8 partially overlap each other, wherein the adjoining faces of the housing elements conform to each other and the front face 41 of the first housing element 4 and the uncovered front face 81 of the second housing element 8 flush with each other. In the substantially extended position, the device 2 has a shallower but more extended configuration.

The right-hand side drawing of FIG. 1b shows the rear view of the device 2 in the substantially extended position/(housing) configuration. In the substantially extended position, the lens of the camera module 17 is visible and operable (in both embodiments with or without said aperture 96 in the second housing element 8 in rear view 83).

The device 2 according to an embodiment of the invention as depicted in FIGS. 1a and 1b has a "two step"-configuration as both the first and the second housing elements 4 and 8 correspond to a two-step stepladder or a two-step library step, which can be placed on top of each other with the steps facing.

Figure 1C:
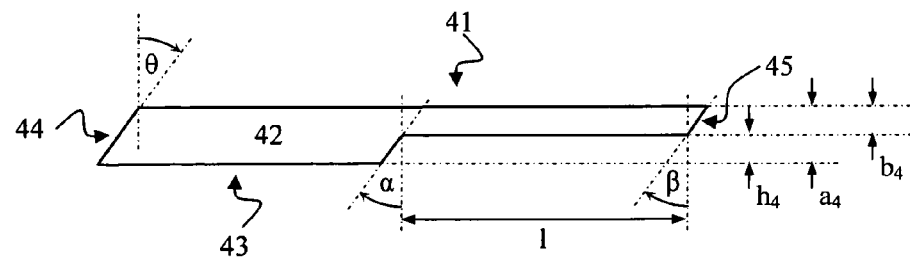
FIG. 1c shows separated plan views of housing elements according to an embodiment of the present invention.
Figure 1C:
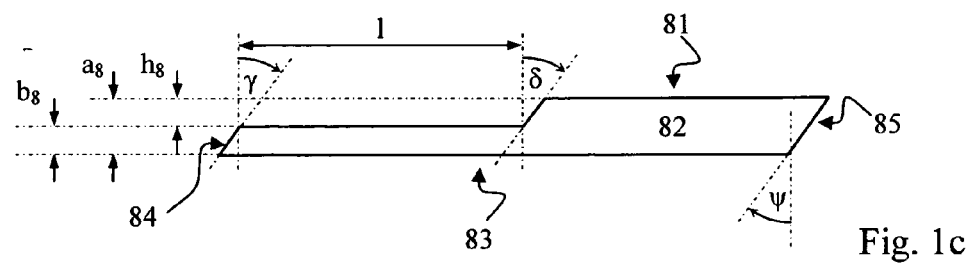

With reference to FIG. 1c, principle measures and shapes of the housing elements according to an embodiment of the invention should be illustrated. FIG. 1c illustratively depicts a side view of the housing elements 4 and 8 of the device 2 in a separated arrangement but in analogy with the side view illustrations shown FIGS. 1a and 1b and described above with reference thereto. In more detail, the side face 42 of the first housing element 4 is illustrated and indicated as well as the side face 82 of the second housing element 8 is illustrated and indicated. Although the illustrations referred to in the description of the present invention comprises side views of one or more embodiment, those skilled in the art will appreciate that any cross sections may show substantially same shapes, when the cross sections are obtained form cuts substantially perpendicular to the front surface of the device 2 and/or parallel to the side faces of the device 2. In accordance with the embodiment illustrated, each of the font face 86 of the second housing element 8 and the rear face 43 of the first housing element 4 has a step in accordance with the aforementioned "two step"-configuration. The steps at the font face 86 and the rear face 43 have step faces with inclination angles $\delta$ and $\alpha$, respectively, in relation to the respective face. Moreover, each of the top faces 44, 84 of the first and second housing element 8 has an inclined shape, respectively. Likewise, each of the bottom faces 45 and 85 of the first housing element 4 and second housing element 8 has an inclined shape, respectively, wherein the inclined shape of the bottom face 45 of the first housing element 4 should be defined by an inclination angle $\beta$ and the inclined shape of the top face 84 of the second housing element 8 should be defined by an inclination angle $\gamma$ (the inclination angles should be defined in relation to the respective face of the housing element). For the sake of completeness, the inclined shape of the top face 44 of the first housing element 4 should be defined by an inclination angle $\theta$ and the inclined shape of the bottom face 85 of the second housing element 8 should be defined by an inclination angle $\psi$.

Furthermore, each of the housing elements 4 and 8 has substantially a first thickness $a_4$ and $a_8$ as well as a second thickness $b_4$ and $b_8$. According to the embodiment shown in FIG. 1c, the first housing element 4 has a first thickness $a_4$ at the top part and a second thickness $b_4$ at the bottom part. Correspondingly, the step at the rear face 43 of the first housing element 4 has a height $h_4$, wherein $h_4=a_4-b_4$. The second housing element 8 has a first thickness $a_8$ at the bottom part and a second thickness $b_8$ at the top part, wherein the step at the front face 81 of the second housing element 8 has a height $h_8$, wherein $h_8=a_8-b_8$. According to the shown embodiment, the thicknesses b should be less than the thicknesses a.

Without being limited thereto, the sum of the thicknesses $a_4$ and $b_8$ should be further equal to the sum of the thicknesses $a_8$ and $b_4$, wherein the sum thereof is equal to the total thickness ($h_{ret}$) of the device 2 in retracted position. The same total thickness $h_{ret}=a_4+b_8=a_8+b_4$ ensures that the rear face 43 and the front face 81 of the respective housing elements 4 and 8 are in contact when the device 2 is in retracted position.

Without being limited thereto, the step heights $h_4$ and $h_8$ of the steps at the font face 86 and the rear face 43 should be equal to the corresponding thicknesses $b_8$ and $b_4$ to enable the front faces 41 and 81 lying in a substantially same plane. It should be noted that the total height ($h_{ext}$) of the device 2 in extended position is equal to the sum of the thicknesses $b_4$ and $b_8$, the thickness $a_4$, and the thickness $a_8$, respectively.

Without being limited thereto when the device 2 is in retracted position, a seamless fitting of the first housing element 4 and the second housing element 8 may be obtained by selecting a common inclination angle of the steps, i.e. inclination angle α equal to inclination angle δ.

Without being limited thereto when the device 2 is in extended position, a seamless fitting of the first housing element 4 and the second housing element 8 may be obtained by selecting a common inclination angle of the top face 84 of the second housing element 8 and the bottom face 45 of the first housing element 4, i.e. inclination angle γ equal to inclination angle β.

The inclination angles mentioned above are defined in relation to a middle plane of the device 2 but may also be defined in relation to any other suitable plane e.g. a plane defined by a vector describing the direction of extension (which may correspond to the direction of the first movement) and one of the faces of the first and second housing elements 4, 8, which are substantially conformingly and arranged in opposition to each other in retracted position of the device 2, respectively.

Without being limited thereto, the parts of the housing elements 4, 8, which adjoin (and/or may be adjacent) and cover each other in extended housing configuration should have the same length l.

It should be noted that in general, but not being limited thereto, the housing elements may have a rotation symmetrical or axial symmetrical shape in relation to a transversal axis perpendicular to the side faces illustrated and a rotation of 180° thereabout, respectively.

FIGS. 2a to 2d show side views of the embodiment of the present invention illustrated in FIGS. 1a and 1b, which side views depict configurations of the housing elements 4, 8 in relationship to each other in retracted and extended housing configuration as well as during conversion from one configuration into the other one. The conversion from retracted into extended housing configuration is operable with a movement of the first and second housing elements 4, 8 against each other.

The movement of the housing elements is depicted by the means of snap-shot illustrations of the housing configuration, wherein the conversion will be described with respect to the movement of the first housing element 4. Those skilled in the art will appreciate that the reference point selected is not intended as being limited thereto. The movement may be divided into substantially two basic movements including a first movement during a first phase and a second movement during a second phase. The movements are preferably successive. This means that, when converting the device 2 starting from retracted configuration (as illustratively shown in FIG. 1a) and ending at the extended configuration (as illustratively shown in FIG. 1b), the first movement may be distinguished by a movement substantially parallel to the direction in which the housing configuration is extended, where the confronting adjoining faces of the housing elements slide against other and the second movement may be distinguished by a movement bringing together the confronting but spacious separated housing elements 4, 8, again. In accordance with the embodiment shown in FIG. 1c, where the front and rear faces of the housing elements are substantially parallel to each other, the first movement should be substantially linear, when the adjoining faces of the housing slide against each other.

The direction of the second movement may be substantially guided by the bottom face 45 and the corresponding step face of the step at the front face 81, which (mutually) confront each other, as well as the bottom face 84 and the corresponding step face of the step at the rear face 43, which (mutually) confront each other, according to an embodiment of the present invention. According to this embodiment, the second movement may be substantially parallel to inclined faces 45, 85 and the step faces, respectively and hence may be substantially linear without being limited thereto.

Moreover, when converting the device 2 starting from extended configuration (as illustratively shown in FIG. 1b) and ending at retracted configuration (as illustratively shown in FIG. 1a), the aforementioned two basic movements are performed in reverse order and in reverse direction, respectively.

Figure 2A:
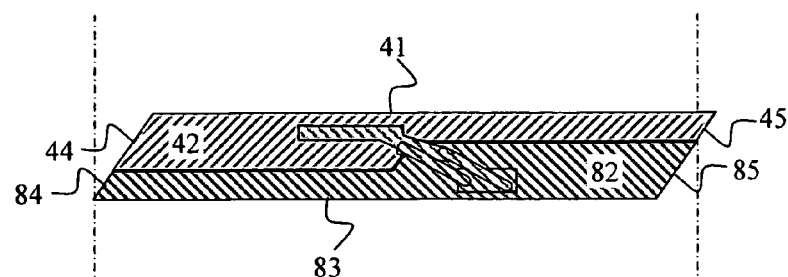
FIGS. 2a to 2d show schematic snap-shot plan views of a housing configuration during conversion according to an embodiment of the present invention.

FIG. 2a illustratively depicts device 2 in retracted configuration in analogy to the side view illustrated in FIG. 1a and described above with reference thereto. The first housing element 4, the side face 42 of which is illustratively shown, substantially covers or overlaps the second housing element 8, the side face 82 of which is illustratively shown. The rear face 43 and the front face 81 are in conformingly adjoining arrangement.

Figure 2B:
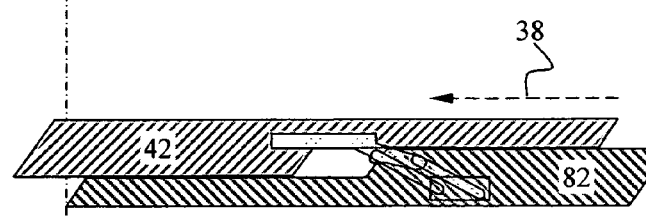

With regard to FIG. 2b, the first and second housing elements 4 and 8 are slidably affixed to each other such that the elements 4, 8 can be moved, shifted, or slid against each other for instance upon application of an externally exerted force applied to the housing elements and exerting a separating force in extension direction. Assuming the second housing element 8 as reference, the first housing element 4 is slidable in the extension direction 38 of the housing of the device 2. It should be noted that the extension direction should be defined as that direction, towards which the housing configuration comprising the two housing elements extents, when the configuration is converted from retracted configuration to extended configuration.

As aforementioned, the first housing element 4 and the second housing element 8 correspond to a two-step stepladder or a two-step library step in side view. These elements can be placed on top of each other with the steps facing the corresponding bottom as well as top faces of the housing elements 4, 8.

Figure 2C:
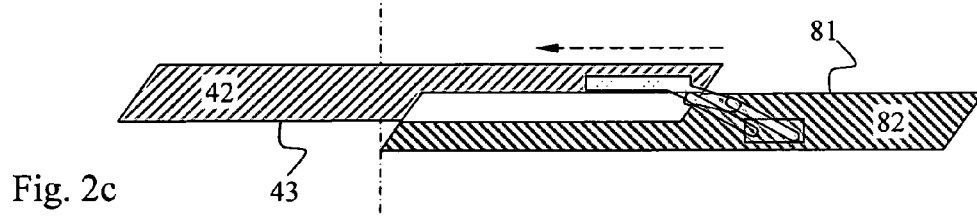

With reference to FIG. 2c, the sliding movement, i.e. the first movement 38, is continued upon application of the (externally exerted and separating) force and ends when the device 2 has substantially reached the maximum extension (except for an eventual length contribution of the inclined bottom face 45, top face 84 and the step faces, respectively, in accordance with a detail implementation of the embodiment). At the end position of the of the first movement, the parts of the housing elements 4 and 8 having less thickness (i.e. the parts having the thickness $b_4$ and $b_8$, respectively, according to the embodiment illustrated) are arranged in a substantially overlapping arrangement but these parts should not be in substantially plane contact up to now. The second movement, which may be for instance a shift movement parallel to the inclined bottom face 45, top face 84 and the step faces, respectively, enables bringing together the both housing elements 4, 8 (and especially the aforementioned parts thereof) into substantially (two-dimensional) plane contact with each other, again.

Figure 2D:

With reference to FIG. 2d, the second movement 39 is directed substantially at the second housing element 8 and a substantially plane overall surface of the device in extended configuration may obtained according to the measures of the illustrated embodiment such that the uncovered front faces of the housing elements 4, 8 flush with each other and/or the uncovered rear faces of the housing elements 4, 8 flush with each other. This means that the uncovered parts of the front faces 41 and 81 may be now aligned in a substantially common plane. In accordance with the aforementioned thickness measures of the housing elements 4, 8 according to an embodiment of the invention, the substantially common plane, in which the uncovered parts of the front faces 41 and 81 are arranged, is obtained when the sum of the thicknesses $b_4$ and $b_8$ is equal to the total thickness of the device 2 in extended position. The same may apply to the rear faces 43 and 83.

Figure 2E:
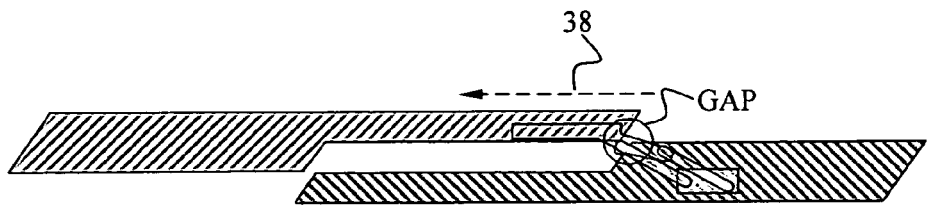
FIGS. 2e to 2g show schematically snap-shot plan views of housing configurations during conversion according to further embodiments of the present invention.
Figure 2F:

With reference to FIGS. 2e and 2f, a further embodiment should be illustrated, which snap-shot illustrations depicted therein should be understood in view of the snap-shot illustrations shown in FIGS. 2c and 2d and described with reference thereto. According to the embodiment shown in FIGS. 2e and 2f, the sliding movement, i.e. the first movement 38, is continued upon application of the (externally exerted and separating) force and ends when the device 2 has substantially reached the maximum extension such that a gap between the bottom end of the first housing element 4 and the second housing element 8 is present. At this end position of the of the first movement, the parts of the housing elements 4 and 8 having less thickness (i.e. the parts having the thickness $b_4$ and $b_8$, respectively, according to the embodiment illustrated) are arranged in a substantially overlapping arrangement but these parts should not be in substantially plane contact up to now. The second movement 39, which may be for instance a movement shift movement enables bringing together the both housing elements 4, 8 (and especially the aforementioned parts thereof) into substantially (two-dimensional) plane contact with each other. The second/shift movement 39 may be a shift movement, which in general can be carried out along any trajectory such as a substantially linear trajectory, a curved trajectory or any otherwise shaped trajectory including any piecewise defined trajectory, where each part thereof may define any superposed movements in relation to the extension direction and a perpendicular direction thereof.

With reference to FIG. 2d, the second movement 39 is directed substantially at the second housing element 8 and a substantially plane overall surface of the device 2 in extended configuration is obtainable according to the measures of the illustrated embodiment such that the uncovered front faces of the housing elements 4, 8 flush with each other and/or the uncovered rear faces of the housing elements 4, 8 flush with each other. This means that the uncovered parts of the front faces 41 and 81 may be now aligned in a substantially common plane. In accordance with the aforementioned thickness measures of the housing elements 4, 8 according to an embodiment of the invention, the substantially common plane, in which the uncovered parts of the front faces 41 and 81 are arranged, is obtained when the sum of the thicknesses $b_4$ and $b_8$ is equal to the total thickness of the device 2 in extended position. The same may apply to the rear faces 43 and 83.

In the presence of a gap at the end position of the first movement 38, those skilled in the art will appreciate, that the second movement may not be guided by the bottom face 45 and the corresponding step face of the step at the front face 81, which (mutually) confront each other, as well as the bottom face 84 and the corresponding step face of the step at the rear face 43, which (mutually) confront each other, but which are not in adjacent arrangement with each other. This means that the direction and guidance of the second movement 39 is substantially defined and guided by a mechanism, which affixes the housing elements 4, 8 to each other and enables the aforementioned extendibility of the device housing.

Figure 2G:
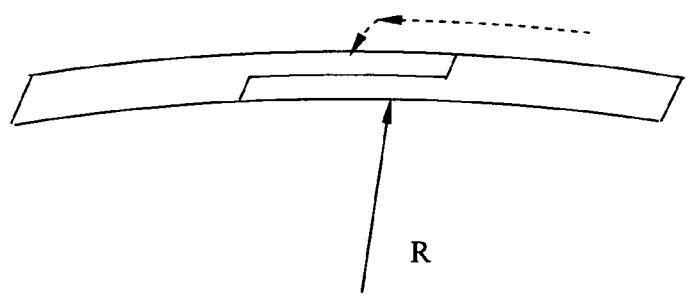

An additional embodiment of the present invention is schematically depicted in FIG. 2g, which illustrates an extendible device in extended housing configuration. The housing elements 4 and 8 may have front faces and rear faces, which are shaped to substantially conformingly correspond to surface sector of a cylinder with a radius R. In more detail, the cylindrical surface sector may be a surface sector having boundaries parallel to a circular base surface and perpendicular thereto. Those skilled in the art will appreciate that the first movement as described above is directed in extension direction and curved in substantial correspondence with the curved shape of the front face 81 of the second housing element 8 and the rear face 43 of the first element 4, respectively. The general considerations concerning to the second movement aforementioned apply mutatis mutandis.

Moreover, those skilled in the art will understand that the measures and angles defined and described above with reference to FIG. 1c can be transferred to the embodiment shown in FIG. 2g, mutatis mutandis. In particular the (inclination) angles should defined in relation to a middle plane of the device 2 but may also be defined in relation to any other suitable plane e.g. a plane defined by a vector describing the direction of the extension and one of the faces of the first and second housing elements 4, 8, which are arranged in opposition to each other in retracted position of the device 2. This means, the reference plane may be in general any flat or curved plane.

Figure 3A:
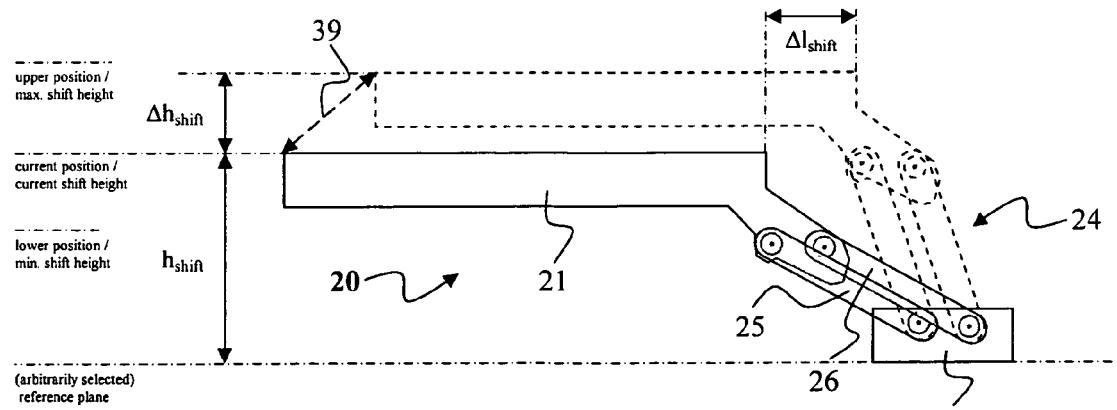
FIGS. 3a to 3c show schematically a lever and slide mechanism according to a first and second embodiment of the present invention and implementation details according to further embodiments of the present invention.
Figure 3B:
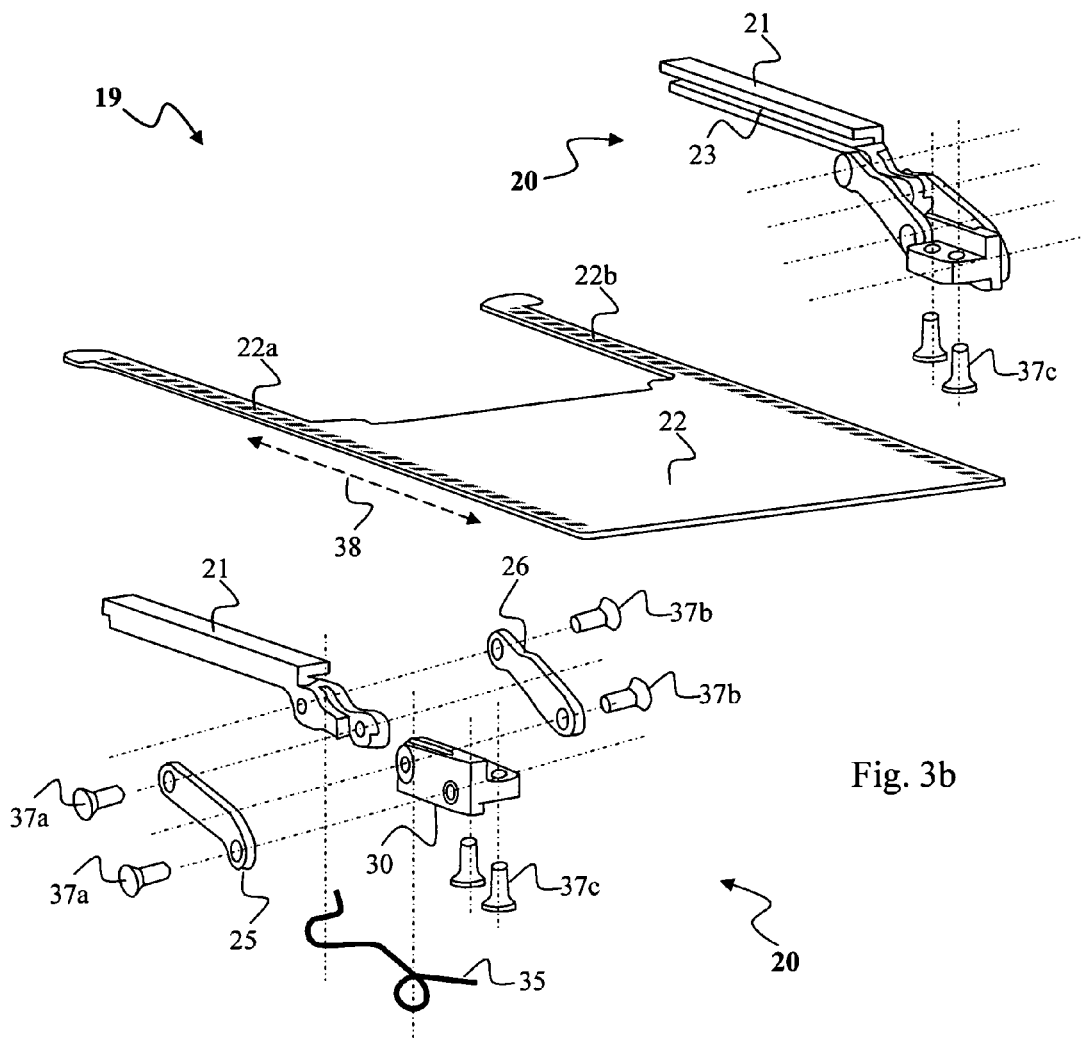

With reference to FIGS. 3a and 3b, an extension mechanism comprising one or more lever and slide mechanisms according to an embodiment of the present invention will be described, which enables the aforementioned movement of the housing elements in respect to each other allowing the conversion of the housing configuration between retracted configuration to extended configuration. FIG. 3a illustrates a principle lever and slide mechanism according to an embodiment of the invention, whereas FIG. 3b illustrates a more detailed embodiment thereof. However, it should be understood that the present invention is not limited to any specific implementation of the lever and slide mechanism described with reference to FIGS. 3a and 3b.

The lever and slide mechanism 20 according to the embodiment shown in FIG. 3a comprises a guideway body element 21 adapted for slidable engagement with a slidable counterpart element (not shown). The slidable counterpart element is allowed sliding against the guideway body element 21, wherein the sliding direction may be substantially longitudinal to guideway body element 21. A more detailed description of the guideway body element 21 and the slidably engaging counterpart element will be given below with reference to FIG. 3b. It should be noted that the counterpart element should be affixed to or mounted at the first housing element 4, without being limited thereto. The guideway body element 21 may be connected through a lever mechanism 24 to a fixture element 30, which in turn may be provided to be affixed to or mounted at the second housing element 8, without being limited thereto. The mounting of the guideway rail element and the fixture element 30 may be also done vice versa.

The lever mechanism 24 may enable a parallel shift of the guideway body element 21 about a shift height $h_{shift}$ (and the guideway groove element thereof, hence) on actuation of the lever mechanism 24. This means the longitudinal orientation of the guideway body element 21, which may be defined by an orientation angle in relation to any reference plane, maintains the same while the shift height $h_{shift}$ in relation to the reference plane may be adjustable upon actuation of the lever mechanism 24. This mechanical behavior of the lever mechanism 24 is illustratively depicted by the means of a dashed line depiction of the guideway body element 21 at any other shift height $h_{shift}$. Due to mechanical constraints the shift height of the guideway body element 21 may be limited within a range defined by a lower position and an upper position thereof.

According to the embodiment illustrated in FIG. 3a, the lever mechanism 24 comprises two lever elements 25 and 26. One end of each lever element 25 and 26 should be pivotably attached to the guideway body element 21 and the other end of each lever element 25 and 26 should be pivotably attached to the fixture element 30. It should be assumed that the fixture element 30 is affixed to or mounted at the second housing element 8, without being limited thereto. The pivotable affixture of the lever elements 25 and 26 to the guideway body element 21 as well as the fixture element 30 can be obtained by the means of joint shaft elements (schematically indicated in FIG. 3a, only).

Alternatively, the lever elements 25 and 26 may have shaft pins, which likewise enable pivotable attaching of the lever elements 25 and 26 to the guideway body element 21 as well as the fixture element 30. It should be also noted that according to an embodiment of the present invention, the two lever elements 25 and 26 are substantially arranged in parallel to each other, but may be disposed horizontally and/or vertically to each other.

The lever mechanism 24 comprising the two lever elements 25 and 26 in accordance with the embodiment of the invention shown in FIG. 3a enables the aforementioned parallel shift while maintaining the orientation in relation to the reference plane upon actuation of the lever mechanism. Further, the embodiment of the lever mechanism 24 as illustrated above implies a longitudinal shift $l_{shift}$ in addition to the height shift $h_{shift}$ upon actuation. This means that when the lever mechanism 24 is actuated to perform a height shift $h_{shift}$ towards a plane defined for instance by the fixture element 30 (such a height shift should be also designated as downward shift), the guideway body element 21 shifts about the longitudinal shift $l_{shift}$ in a longitudinal direction in relation to the guideway body element 21 away from the fixture element 30. The longitudinal direction defined here corresponds to the extension direction defined above. Correspondingly, when the lever mechanism 24 is actuated to perform a height shift $h_{shift}$ away from a plane defined for instance by the fixture element 30 (such a height shift should be also designated as upward shift), the guideway body element 21 shifts about a longitudinal shift $l_{shift}$ in a longitudinal direction in relation thereto towards the fixture element 30.

The total shift direction is obtained from the superposition of both shift movements, i.e. the height shift $h_{shift}$ and the longitudinal shift $l_{shift}$, and the superimposed total shift direction is indicated as direction of movement 39, which corresponds to the aforementioned second movement of the first housing element 4 in relation to the second housing element 8. The lever mechanism 24 according to the embodiment described allows for the second substantially linear movement in accordance with the inclined faces.

With reference to FIG. 3b, a more detailed embodiment of an extension mechanism 19 comprising exemplarily two lever and slide mechanisms 20 is illustrated. The lever and slide mechanisms 20 of the embodiment of FIG. 3b comprises likewise a guideway body element 21, which is provided with a guideway groove element 23. The guideway groove element 23 of the guideway body element 21 is arranged longitudinal to the guideway body element 21 and is adapted to accept a slidable counterpart element. The slidable counterpart element adapted for acceptance by the guideway groove element 23 may be a slidable frame element 22 according to the embodiment shown in FIG. 3b, which slidable frame element 22 comprises slide areas 22a and 22b arranged at the longitudinal sides of the slidable frame element 22 in relation to the extension direction of the device housing.

These slide areas 22a and 22b of the slidable frame element 22 provide two slidable rail elements, each of which being adapted for acceptance in a guideway groove element 23 of a guideway body element 21. Those parts of the slidable frame element 22 adapted for slidable rail elements are indicated as hatched areas 22a and 22b thereof. Without being limited thereto, the slidable frame element 22 is provided for being affixed to or mounted at the first housing element 4.

The lever and slide mechanism 20 shown in FIG. 3b comprises likewise a fixture element 30, which is adapted to be affixed to or mounted at the second housing element 8 of the device 2 (without being limited thereto) for example by the means of rivets, screws or any other fixing elements 37c enabling a secure fixture to the housing element 8. The guideway body element 21 is connected with the fixture element 30 by the means of a lever mechanism 24, which according to the embodiment comprises also two lever elements 25 and 26. The lever mechanism 24 allows for parallel shift upon actuation as described above. The lever elements 25 and 26 are mounted at the guideway body element 21 and the fixture element 30 by the means of joint shaft elements 37a and 37b which may be embodied as one-piece rivets, two-piece rivets, screws, or any other suitable fastening means fixing the lever element 25 and 26 and allowing the lever elements 25 and 26 pivoting thereabout.

According to the illustrated embodiment, two lever and slide mechanisms 20 are provided. These lever and slide mechanisms 20 should be arranged at the each side in relation to the sliding direction, i.e. the direction of the first movement. Hence, the slidable frame element 22 is supported at the longitudinal sides thereof as indicated by the means of the hatched areas 22a and 22b indicated. Upon actuation, the slidable frame element 22 is slidable in longitudinal direction (i.e. direction of extension) guided within the guideway groove elements 23. The sliding direction of the slidable frame element is defined by the orientation of the guideway body elements 21 and the guideway groove elements 23 thereof. This means, the slidable frame element 22 interposed between the lever and slide mechanisms 20 to support the slidable frame element 22 (slidably) engages with the guideway groove elements 23 of the guideway body elements 21.

The sliding movement of the slidable frame element 22 enables the aforementioned first (substantially linear) movement of the first housing element 4 against the second housing element 8. The parallel shift as described above with reference to FIG. 3a enables the aforementioned second (substantially linear) movement of the first housing element 4 towards or away from the second housing element 8.

It should be noted that the slidable frame element as depicted in FIG. 3b and described with reference thereto should not be understood as being limited thereto. Alternatively, two or more slidable (rail) elements may be implemented replacing the slidable frame structure. Nevertheless, the slidable frame structure may have the advantage to stabilize the lever mechanism arrangement against any torsion, which may obstruct the sliding movement.

An elastic element 35 such as a spring element or action spring may be included into the lever mechanism. The elastic element 35 is provided to exert a force into downward direction (in the sense defined above). This means that the first and second housing elements 4 and 8 are forced against each other in case the device is in retracted position and/or during the first movement of the first housing element 4 against the second housing element 8. The exerted force pressing the first housing element 4 against the second housing element 8 causes friction which counteracts the sliding movement. An externally applied force has to overcome the friction to cause the housing elements 4 and 8 to slide against each other. Once the housing elements 4 and 8 have reached the substantially maximum extension (except for an eventual length contribution of the inclined bottom face of the first housing element 4 and top face and the second housing element 8, respectively, in accordance with a detail implementation of the embodiment), the present force exerted by the elastic element 35 causes the lever mechanism to shift downwards until the first and the second housing elements 4 and 8 are again in contact (cf. also FIG. 2c and description referring thereto). In case of a housing arrangement in extended position, an externally applied force has to overcome the force exerted by the elastic element when the housing arrangement should be moved back into retracted position.

The force exerted by the elastic element 35 stabilizes housing arrangement in any position including retracted position, extended position and any position between them. An alternative embodiment may include an elastic element to support automatic movement. For instance, an elastic element such as a spring may be included, which drives the movement of the first housing element 4 from retracted position into extended position. For moving back from extended position into retracted position, an external force may have to be applied against the elastic element driving the automatic movement. Elastic energy is saved in the elastic element driving the automatic movement to enable a next automatic movement.

Another alternative embodiment may be arranged to exhibit a bistable extension mechanism. This means that an initial force may have to be overcome when converting the housing arrangement from retracted position into extended position and an initial force may have also to be overcome when converting the housing arrangement from extended position into retracted position. When the housing arrangement is in any position between these end positions the movement of the housing elements 4 and 8 against each other is substantially free, i.e. no forces counteracting the movement are present.

Figure 3C:
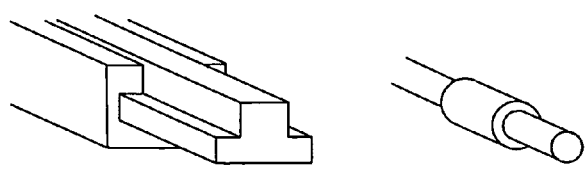

With reference to embodiments shown in FIG. 3c, a selection of different guideway body elements are presented, which may be used to realize the lever and slide mechanism 20 illustrated above on the basis of the non-limiting embodiments shown in FIGS. 3a and 3b. Instead of a guideway groove element 23, which slidably engages with the slidable frame 22 and the rail elements 22a, 22b thereof, an alternative guiding means may be provided at the guideway body element 21 and an alternative slidable counterpart element, which is adapted for slidably engaging with the guideway body element and which is conformingly shaped in correspondence with the alternative guiding means, may be arranged.

According to a first alternative embodiment of the guideway body element 21, a guideway projection element may be arranged thereat. The guideway projection element of the guideway body element may be arranged longitudinally to the guideway body element and should be adapted to accept a slidable counterpart element. The slidable counterpart element adapted for acceptance by the guideway projection element may be a slidable frame element, which comprises for instance one or two groove elements arranged at the longitudinal sides of the slidable frame element in relation to the extension direction of the device housing. The slidable frame element may provide two slidable groove elements, each of which being adapted for acceptance in a guideway projection element of a guideway body element. Without being limited thereto, the slidable frame element is provided for being affixed to or mounted at the first housing element 4. Mutatis mutandis, the slidable counterpart element adapted for acceptance by the guideway projection element may be a slidable rail element, which comprises a groove element shaped conformingly to the guideway projection element and adapted for sliding against the guideway projection element.

According to a second alternative embodiment of the guideway body element 21, in general, an embodiment thereof should be shaped to enable conforming engagement with a slidable counterpart element. The guideway body element may have a substantially cylindrical shape such as a circular cylindrical shape or an elliptic cylindrical shape. It should be noted that the base face of such a cylindrically shaped guideway body element may have any other shape with or without any edges, corners, angled boundaries and/or corners. Those skilled in the art will appreciate that rounded shape may prevent from tilting during sliding movements.

The slidable counter element at least partly enclose the guideway body element, wherein both elements, i.e. the slidable counter element and the guideway body element, are shaped for conforming engagement with each other. In case of the guideway body element having a substantially cylindrical shape the slidable counter element may be provided with a corresponding cylindrical recess such that the slidable counter element at least partly encloses the guideway body element; i.e. the slidable counter element may comprise a hollow cylindrical adapter slidably engaging with the guideway body element and for instance affixed to the first housing elements by the means of any fixture elements of the slidable counter element.

Moreover, the guideway body element 21 may be arranged for instance substantially centrally to the side faces of the housing elements 4, 8 and the device housing, respectively, according to a further embodiment of the invention. This means that the extension mechanism of the device 2 may comprise only one slide and lever mechanism 20 and one lever mechanism 24. The guideway body element may be provided with two guideway groove elements and/or guideway projection elements each of which being arranged at one side of the groove body element 21. One or more slidable counterpart elements are correspondingly arranged with the for instance substantially centrally arranged guideway body element 21 for slidably engagement. For instance, the slidable counterpart element may be a slidable frame element with a longitudinal notch element, wherein the edge areas of the notch element slidably engage with guideway groove elements of the slidable frame element. Alternatively, the slidable counterpart element may be a slidable frame element with a longitudinal notch element, wherein the side faces of the slidable frame element forming the notch element thereof are provided with grooves, which slidably engage with guideway projection elements provided at the sides of the guideway body elements. Furthermore, a slidable counter element and a guideway body element shaped for conforming slidable engagement with each other such as illustrated in the second embodiment of FIG. 3c would also enable a substantially central arrangement of the guideway body element 21 and enable an extension mechanism comprising one slide and lever mechanism 20 and one lever mechanism 24.

Those skilled in the art will appreciate on the basis of the description above with reference to FIG. 2g and in view of the extension mechanism 19 described above with reference to FIGS. 3a to 3c that in case of a longitudinal curved housing (cf. FIG. 2g) and curved housing elements thereof, the one or more guideway body elements and the corresponding one or more (slidably engaging) slidable counterpart elements may have or may require a substantially conforming curved shape, in particular longitudinally curved shape.

Those skilled in the art will appreciate that several features described with reference to one of the embodiments of the present invention can also be present at any other embodiment of the present invention and/or one or more functionalities thereof apply mutatis mutandis.

Figure 4C:
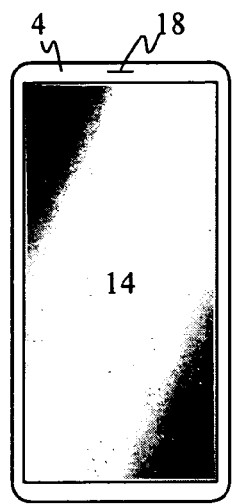
Figure 4C:
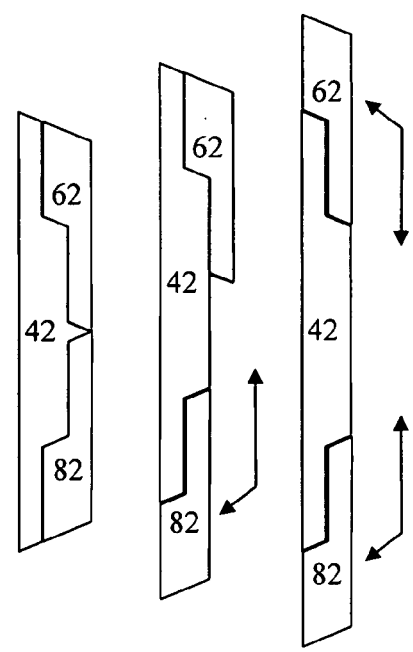
Figure 4C:
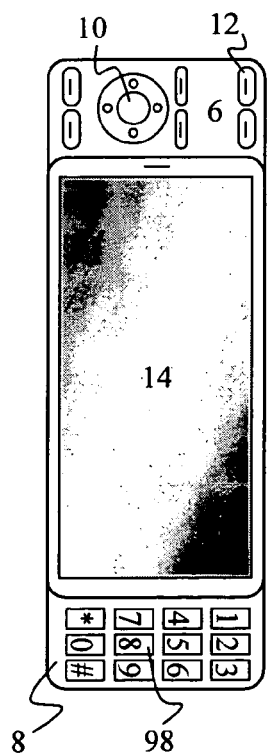
Figure 4C:
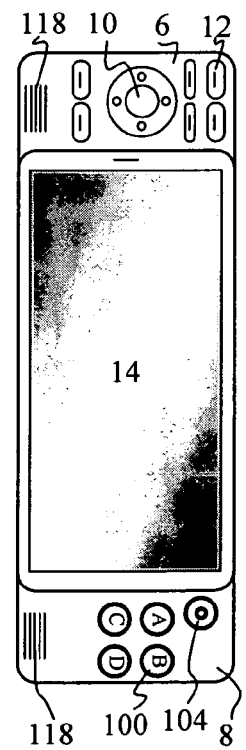

FIGS. 4a to 4c show an embodiment of the present invention having a configuration comprising three housing elements. The depicted extendible mobile electronic device is embodied as an extendible cellular phone, an extendible touch-screen personal digital assistant (PDA), game module, and/or the like. FIG. 2a depicts a front plan view, FIG. 2b depict a side plan view in the retracted position, side plan view in a partially extended position, and side plan view in a fully extended position, and FIG. 4c depicts front plan views of two different embodiments of the device in extended position.

FIG. 4a shows the extendible touch-screen personal digital assistant comprising for instance a full size touch screen display 14 and an earpiece 18 arranged in a centered position over the display. The depicted device is designed e.g. for pen operation.

FIG. 4b shows from left-hand to right-hand side the device of FIG. 4a being in a fully closed position, a partially closed position (where the second housing element is in extended position, only), and a fully extended position (where both second and third housing elements are in respective extended positions). Due to the configuration and the arrangement of the movable housing elements, the overall width (or length) of the device in the extended position may be approximately 1.5 the width (of the length) of the device in the retracted position (as in the case of FIGS. 1a and 1b).

FIG. 4c depicts two front views of the device being in the open (extended) position, wherein the embodiment depicted at the left side is embodied as a telephone implementation, and the embodiment depicted at the right side is embodied as a gaming device implementation. The telephone embodiment may comprise a browsing key 10 and some menu keys 12 on the left (third) extended housing element 6, and an ITU-T keyboard 98 on the right (second) extended housing element 8. The gaming device embodiment may comprise a big thumb stick 10 (a thumb operated joystick), some keys 12 on the left extended housing element, and a number of action keys 100, and a small thumb stick 104 (a thumb operated joystick) on the right extended housing element 8. Both extended housing elements 6 and 8 of the gaming device embodiment may be provided with stereo loudspeakers 118 indicated as sound outlets.

It is also envisaged to implement a full QWERTY keyboard on the extendible housing elements (not depicted).

Those skilled in the art will appreciate from the embodiment shown in FIGS. 4a to 4c that the applicability of the slide and lever mechanism described above in detail is not limited to an upright form factor of the housing as illustrated in FIGS. 1 to 2. The embodiment of FIG. 4 exemplarily illustrates an extendible housing element configuration, which extension direction is transversal to the orientation of the device, in which the device is usually handled. Those skilled in the art will understand that the aforementioned lever and slide mechanisms 20 should have to be oriented in the corresponding (transversal) direction.

FIGS. 5a to 5c show further embodiment of the present invention by the means of three different implementations of sliding or movable configurations, each depicted in a retracted and in an extended position in side views. In accordance with the embodiment shown in FIG. 5a, the first housing element (on the left hand side) has an extended upper section. The second housing element (on the right hand side) has a configuration described above and may be provided with an unlocking button. In this housing arrangement only the retracted configuration has a substantially plane front configuration, while in extended position the rear or front surface has a protrusion in the upper part of the device. This configuration allows different extension ratios between e.g. factors from approximately 1.1 up to 1.5.

The embodiment of FIG. 5b illustrates a three-step housing configuration of substantially similar form. This configuration allows achieving an extension ratio of approximately 1.3 with a configuration that allows a parallelepipedal configuration in extended and in retracted position. Another advantage of this configuration is the larger overlapping area allowing a more solid configuration of the extendable connection. This embodiment represents a "three-step" stepladder implementation of the housing arrangement.

The embodiment of FIG. 5c illustrates three housing elements 42, 62, 82 allowing a three-step and a two-step configuration. This configuration allows achieving extension ratios above approximately 1.5 up to approximately 2. This configuration further allows at least in the fully retracted position a parallelepipedal shape. Another advantage of this embodiment is a larger overlapping area allowing a more solid configuration of the extendable connection. Only in the fully extended configuration, when the second element is extended, a flat front surface is achieved. In case the third housing element 62 is only extended (not depicted), the front surface of the third housing element 62 is not adjacent and not flushing with the front surface of the first housing element 42.

The description above primarily relates to mechanical aspects of the extendible device housing. However, it should be realized that the extendible device housing being enabled by the means of the configurable housing elements thereof may also have effect on the operability of the mobile/portable electronic device. For the sake of completion, the typical portable/mobile electronic devices are processor-based devices, which operate on the basis of one or more processing units including central processing units (CPUs), mobile processing units (MPUs), and/or micro controllers (µCtrls). Moreover, further components such as a data and/or application storage(s), user interface input/output means including typically audio input and/or output (I/O) means, keys, keypad and/or keyboard with key input controller and a display with display controller are conventionally included. Data communications with external entities is operable by one or more data communication interfaces including for instance a cellular communication transceiver, any (local) wireless and/or wired data interfaces. The implementation and/or operation of a processor-based device is will known in the art.

The operation of such a device is conventionally performed under control of the processing unit and typically on the basis of an operating system or one or more basic controlling applications, which are adapted to control the functions, features, and functionality of the device. In general, such function, features, and functionality of the device are enabled by the means of hardware and/or software components. Such hardware components exemplarily described above are enabled for communication with the processing unit through one or more general and/or specific data communication connections and/or busses (serial or parallel). Software components and data thereof are typically stored in the data and application storage, which may comprise any random access memory (RAM), any a read-only memory (ROM) and/or any combination thereof. It should be noted that several memory technologies are applicable to realize RAM and/or ROM storages. In general, software components include a list of instructions to be executed by the processing unit in consequence of which a processing result may be (audibly and/or visibly) presented to the user and/or one or more other (hardware and/or software) components are controlled and/or instructed to operate. The display and display controller are typically controlled by the processing unit and provide information for the user including especially a user interface (UI) allowing the user to make use of the functions, features and functionality of the device. The keypad and keypad controller are provided to enable the user inputting information. The information input via the keypad is conventionally supplied by the keypad controller to the processing unit, which may be instructed and/or controlled in accordance with the input information.

With reference back to the aspect of the extendible device housing, a sensor adapted for detection of the housing configuration may be provided. The sensor may be a micro switch, a micro button, or any other component, which at least is adapted to supply one or more signals indicating whether the device housing is in retracted or extended configuration.

Such a sensor signal may be processed by the devices and/or applications operable with the device. For instance, the operating system may be configured to inform any application about an actual housing configuration, to start (or stop) one or more applications in consequence on a predetermined signal (i.e. upon detection of the actual device housing being in retracted and/or extended configuration), and/or reconfigure any applications in dependence on the actual housing configuration.

For example, it should be assumed that the device is currently operated in standby mode and in retracted configuration. Upon conversion of the device housing into extended configuration, the operation of the device may reactive on the change of the configuration in that for instance the device operation is transferred to an ready operation state including for instance the start or activation of one or more applications predefined or user-configurable.

For example, the assignment of so-called function keys may depend on the housing configuration. Function keys are keys, by the actuation of which predefined applications may be initiated including for instance recalling of received messages, device profile settings, device operation protocols, contact manager, electronic calendar, and the like. Such assignments may be predefined and/or user-configurable.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the claims accompanying. Consequently various options of implementing the invention as determined by the claims, including equivalent implementations, also belong to the scope of the invention.

The invention claimed is:

1. Extendible portable electronic device, comprising
a device housing having at least a first housing element and a second housing element; and
an extension mechanism, comprising
at least one lever and slide mechanism having a guideway body element and a lever mechanism, which is pivotably attached to said guideway body element;
at least one slidable counterpart element, which is adapted for slidable engagement with said guideway body elements;
wherein said lever mechanism is provided for being attached to one of said first and second housing elements and said slidable counterpart element is provided for being attached to said other one of said first and second housing elements;
wherein said first housing element, and said second housing element are extensibly supported to each other, such that said first and second housing elements can adopt a retracted configuration and an extended configuration with respect to each other.

2. Device according to claim 1, wherein a conversion of said device housing from said retracted configuration to said extended configuration comprises a first movement of said housing elements substantially parallel to each other and a second movement of said housing elements approaching each other.

3. Device according to claim 1, wherein said at least one slidable counterpart element is a slidable frame element having at least one sliding areas, which slidably engages with said guideway body element of said at least one lever and slide mechanism.

4. Device according to claim 1, wherein said guideway body element has a guideway groove element or a guideway projection element for slidably guiding said at least one slidable counterpart element.

5. Device according to claim 1, wherein said guideway body element is shaped to be at least partly enclosed by said slidable counterpart element, wherein said slidable counterpart element has a correspondingly shaped recess enabling said at least partly enclosure and sliding engagement with said guideway body element.

6. Device according to claim 1, wherein said first movement is substantially parallel to at least one of first and second front surfaces of said first and second housing elements.

7. Device according to claim 1, wherein each of said lever mechanisms is pivotably attached to one of said first and second housing elements to allow said housing elements to approach each other by substantially shift movement, while in particular substantially maintaining orientations of said housing elements in relation to each other.

8. Device according to claim 1, wherein said lever and slide mechanism comprises a fixture element enabling for attaching said lever mechanism to one of said first and second housing elements.

9. Device according to claim 1, wherein said lever mechanism comprises at least two lever elements, wherein one end of each lever element is pivotably attached to said guideway body element and said other end thereof is pivotable attached to one of said first and second housing elements.

10. Device according to claim 1, wherein an orientation of said guideway body element defines a direction of extension of said extendible device housing.

11. Device according to claim 1, wherein said extension mechanism comprises two lever and slide mechanisms, wherein one of which is arranged in relation to one side of said device housing and another one is arranged in relation to an opposite side of said device housing, wherein said side and opposite side of said device housing are defined in relation to a direction of extension.

12. Device according to claim 11, wherein said slidable counterpart element comprises two slidable elements, each of which engages with one guideway body element of said two lever and slide mechanisms.

13. Device according to claim 1, wherein said extension mechanism comprises one lever and slide mechanism being centrally arranged in relation to side surfaces of said housing elements.

14. Device according to claim 1, wherein in said retracted configuration, said first housing element and said second housing element are located substantially on top of each other, a first rear surface of said first housing element conformingly adjoining a second front surface of said second housing element.

15. Device according to claim 1, wherein in said extended configuration, said first housing element is displaced with respect to said second housing element, wherein a first rear surface of said first housing element is partially adjoining a second front surface of said housing element.

16. Device according to claim 1, wherein in said extended configuration, a first front surface of said first housing element flushes with a second front surface of said second housing element, wherein in particular, said first housing element and second housing element are arranged at a same level, substantially.

17. Device according to claim 1, further comprising:
a display, arranged on a first front surface of said first housing element;
a user input interface element, arranged on said section of a second front surface of said second housing element; and
processing means, connected to said display and to user input interface element.

18. Device according to claim 1, further comprising:
one or more applications operable with said device; and
a sensor for detecting said configuration of said device housing;
wherein said applications are reactive to a signal supplied by said sensor, which signal indicate said housing configuration.

19. Device according to claim 1, further being provided with a pawl for locking said housing in said retracted and/or in said extended configuration.

20. Device according to claim 1, further comprising a cellular telephone module enabling for cellular communications.

21. An extension mechanism, comprising
at least one lever and slide mechanism having a guideway body element and a lever mechanism, which is pivotably attached to said guideway body element; and
at least one slidable counterpart element, which is adapted for slidable engagement with said guideway body elements;
wherein said lever mechanism is provided for being attached to one of first and second housing elements of a device housing and said slidable counterpart element is provided for being attached to said other one of said first and second housing elements;
wherein said first housing element and said second housing element are extensibly supported to each other, such that said first and second housing elements can adopt a retracted configuration and an extended configuration with respect to each other.

22. Mechanism according to claim 21, wherein said at least one slidable counterpart element is a slidable frame element having at least one sliding area, which slidably engages with said guideway body element of said at least one lever and slide mechanism.

23. Mechanism according to claim 21, wherein said guideway body element has a guideway groove element or a guideway projection element for slidably guiding said at least one slidable counterpart element.

24. Mechanism according to claim 21, wherein said guideway body element is shaped to be at least partly enclosed by said slidable counterpart element, wherein said slidable counterpart element has a correspondingly shaped recess enabling said at least partly enclosure and sliding engagement with said guideway body element.

25. Mechanism according to claim 21, wherein each of said lever mechanisms is pivotably attached to one of said first and second housing elements to allow said first and second housing elements to approach each other by substantially shift movement, while in particular substantially maintaining orientations of said housing elements in relation to each other.

26. Mechanism according to claim 21, wherein said lever and slide mechanism comprises a fixture element enabling for attaching said lever mechanism to one of said first and second housing elements.

27. Mechanism according to claim 21, wherein said lever mechanism comprises at least two lever elements, wherein one end of each lever element is pivotably attached to said guideway body element and said other end thereof is pivotable attached to one of said first and second housing elements.

28. Mechanism according to claim 21, wherein an orientation of said guideway body element defines a direction of extension of said device housing being extendible.

29. Mechanism according to claim 21, wherein said extension mechanism comprises two lever and slide mechanisms, wherein one of which is arranged in relation to one side of said device housing and another one is arranged in relation to an opposite side of said device housing, wherein said side and opposite side of said device housing are defined in relation to a direction of extension.

30. Mechanism according to claim 29, wherein said slidable counterpart element comprises two slidable elements, each of which engages with one guideway body element of said two lever and slide mechanisms.

31. Mechanism according to claim 21, wherein said extension mechanism comprises one lever and slide mechanism being centrally arranged in relation to side surfaces of said housing elements.

* * * * *